United States Patent [19]

Falk

[11] Patent Number: 5,388,018
[45] Date of Patent: Feb. 7, 1995

[54] SCANNING DEVICE FOR A MAGNETIC-TAPE APPARATUS HAVING A RADIALLY EXPANDABLE CLAMPING HUB

[75] Inventor: Gerhard Falk, Rossdorf, Germany

[73] Assignee: U.S. Philips Corporation, New York, N.Y.

[21] Appl. No.: 861,753

[22] Filed: Apr. 1, 1992

[30] Foreign Application Priority Data

Apr. 2, 1991 [DE] Germany ............... 4110590

[51] Int. Cl.⁶ .................. G11B 5/52; G11B 21/04
[52] U.S. Cl. .................................... 360/107
[58] Field of Search ...................... 360/84–85, 360/95, 107–109, 129

[56] References Cited

U.S. PATENT DOCUMENTS

| | | | |
|---|---|---|---|
| 4,058,845 | 11/1977 | Zahn | 360/109 |
| 4,354,211 | 10/1982 | Gilovich et al. | 360/84 |
| 4,395,745 | 7/1983 | Aarts et al. | 360/129 |
| 4,464,690 | 8/1984 | Hanecka et al. | 360/84 |
| 4,479,157 | 10/1984 | Aarts et al. | 360/104 |
| 4,594,623 | 6/1986 | Hütter | 360/85 |
| 4,611,255 | 9/1986 | Ushiro et al. | 360/84 |
| 4,891,726 | 1/1990 | Suwa et al. | 360/84 |

Primary Examiner—Robert S. Tupper
Assistant Examiner—Brian E. Miller
Attorney, Agent, or Firm—Brian J. Wieghaus

[57] ABSTRACT

For rotationally locking a motor shaft (16) to a head disc (10) one end of the motor shaft (16) is provided with a clamping hub (15). The clamping hub (15) comprises a clamping sleeve (27) in which two clamping elements (28, 29), spaced apart by a spacer tube (30) and extending in the direction of the axis of rotation, are axially movable. Two conical star washers (32, 33) are mounted between the individual clamping bolts (28, 29) and the ends of the spacer tube (30) and provide a centric expansion of the clamping tube (27) at two locations (38, 39).

14 Claims, 2 Drawing Sheets

SCANNING DEVICE FOR A MAGNETIC-TAPE APPARATUS HAVING A RADIALLY EXPANDABLE CLAMPING HUB

BACKGROUND OF THE INVENTION

The invention relates to a scanning device for a magnetic-tape apparatus having a multi-part guide drum.

A scanning device of this type is known from DE 25 22 900 A1. This known device comprises a two-part stationary tape-guide drum, a head disc which carries at least one magnetic head being rotated in the gap between the two parts and being mounted on one end of the rotor shaft of a head-disc motor. The rotor shaft is connected to a sleeve having a mounting surface which extends perpendicularly to the axis of rotation. This mounting surface supports the head disc, the head disc being detachably connected to the rotor shaft by means of a central fixing screw. However, this known construction has the disadvantage that the accuracy of the path of movement of the magnetic heads secured to the periphery of the head disc depends on a multiple tolerance chain. For example, a comparatively small wobble of the mounting surface may give rise to substantial deviations of the path of the magnetic scanning heads.

SUMMARY OF THE INVENTION

It is the object of the present invention to improve the positioning accuracy of a scanning device of the type mentioned in the opening sentence and at the same to enable the rotary member carrying the magnetic heads to be replaced rapidly and without any problems.

This object is achieved in that a clamping sleeve concentrically engages in a bore of the rotary member and is rotationally locked to the end of the shaft. Two opposing clamping elements and a spacer between the clamping elements are arranged within the clamping sleeve in the direction of the axis of rotation so as to be axially movable, and a conical clamping ring is interposed between each of the clamping elements and the spacer tube, the clamping rings expanding the clamping tube to clamp the clamping sleeve to the rotary member.

The scanning device in accordance with the invention has the advantage that owing to a centric expansion of the clamping hub at two axially spaced locations the rotary member is retained on the clamping hub in a non-positive and wobble-free manner. The clamping process does not affect the height position of the rotary member.

The steps defined in the subsidiary claims enable advantageous modifications and improvements of the scanning device defined in claim 1 to be obtained. A special advantage is that the use of conical star washers having radial slits issuing alternately from the outer edge and the inner edge enables the radial forces produced during clamping to be applied uniformly to the internal flanges of the clamping bolts and the external clamping sleeve.

BRIEF DESCRIPTION OF THE DRAWINGS

An embodiment of the invention will now be described in more detail, by way of example, with reference to the drawings. In the drawings.

DESCRIPTION OF THE PREFERRED EMBODIMENTS

Figure 1:
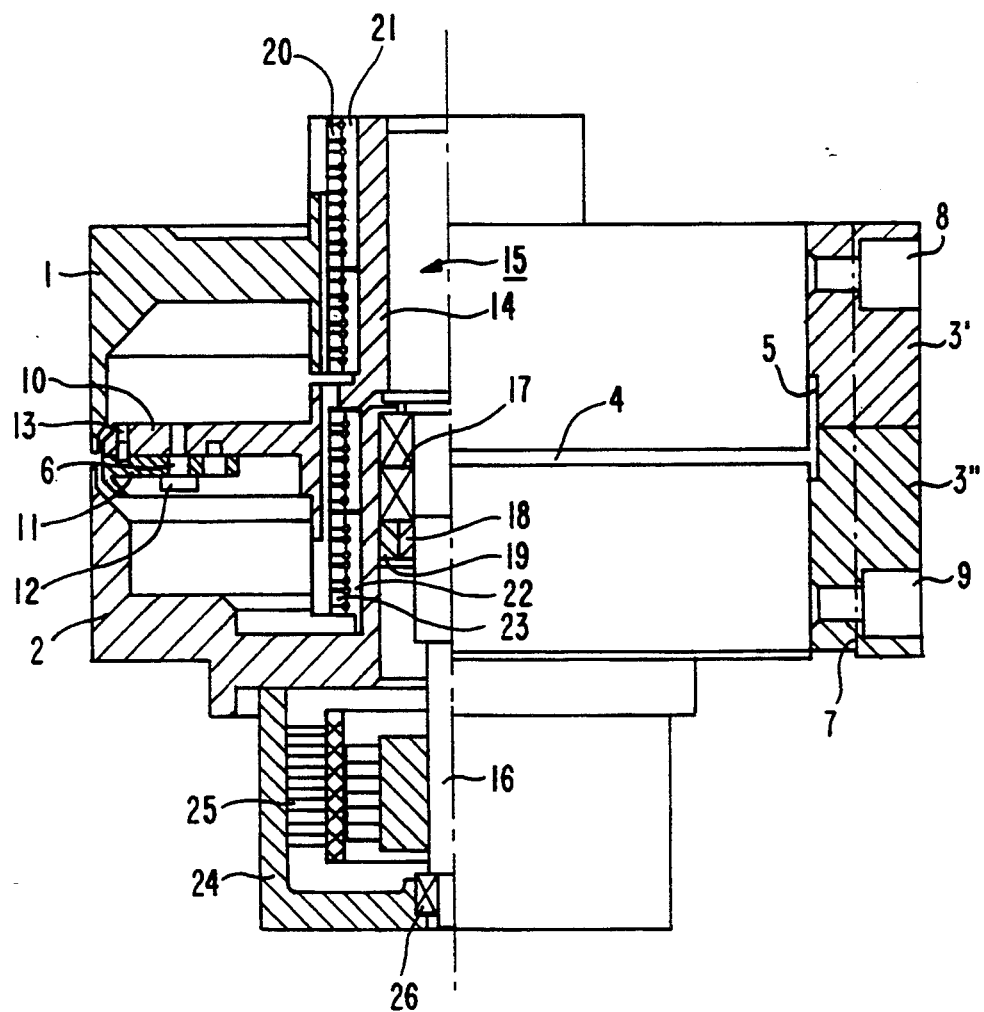
FIG. 1 is partly sectional view of a scanning device for a helical-scan magnetic-tape apparatus.

In FIG. 1 a stationary tape-guide drum 3 has an upper drum section 1 and a lower drum section 2. The upper drum section 1 and the lower drum section 2 are coaxially aligned and secured by means of a prism-like drum guide 3' and 3''. At a location 5 at the level of a dividing gap 4 between the upper drum section 1 and the lower drum section 2 the drum guide 3' and 3'' has a recess for the orbit of magnetic heads 6. The two parts 3' and 3'' of the drum guide are interconnected by screws at 7. The parts 3' and 3'' of the drum guide have bores 8 and 9 which extend perpendicularly to the axial direction of the drum sections 1 and 2 and through which screws (not shown) extend to pull the two drum sections 1 and 2 into a prism of the drum guide and secure them.

A head disc 10, carrying said magnetic heads 6 at its periphery, rotates in the dividing gap 5. The magnetic heads 6 are arranged on tongues of head mounts 11, which are each secured to the head disc 10 by means of a screw 12. At the location of a tongue of the head mount 11 the head disc has a threaded bore 13 for a set-screw which acts upon the tongue of the head mount 11 to provide height adjustment of the magnetic heads 6. The head disc 10 is rotationally locked to a mandrel 14 in which a clamping hub 15 engages. This clamping hub is secured to one end of a shaft 16, which is journalled in a duplex ball-bearing 17 at the level of the orbit of the rotating magnetic heads 6. The inner rings of the duplex ball-bearings 17 are secured by a nut 18 and the outer rings by a screw 19.

The recording signals, erase signals and operating voltages are transferred via rotary transformers arranged above and underneath the head disc 10. The transformers arranged above the head disc 10 comprise a stator section 20 and a rotor section 21, the rotor section 21 being non-positively connected to the mandrel 14 of the head disc 10. The stator section 20 is secured in an inner bore of the upper drum section 1. Spatially separated from the transformers at the recording side the transformers for the reproducing side are arranged underneath the head disc 10, which transformers comprises a stator section 22 and a rotor section 23. In contrast with the rotary transformers arranged above the head disc 10 outer rings, instead of inner rings, of the rotary transformers arranged underneath the head disc 10 are rotationally locked to the rotary head disc 10. The inner rings of the rotary transformers are secured to an outer wall of the shaft bearing situated in the lower drum section 2. A housing 24 accommodating a motor 25 for driving the shaft 16 is secured to the underside of the lower drum section 2, centred relative to the axis of rotation. The housing 24 also accommodates a bearing 26 for the shaft 16.

Figure 2:
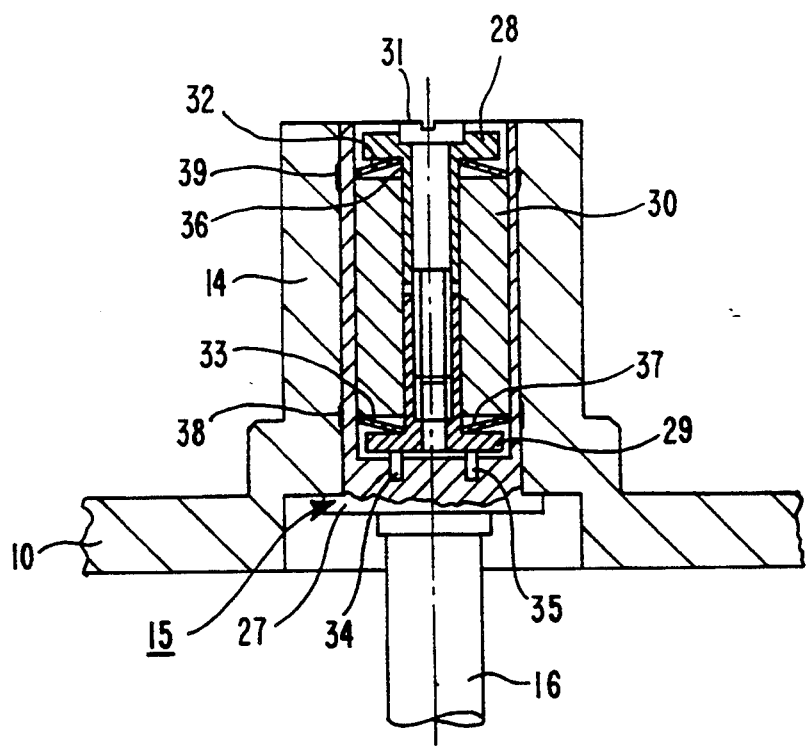
FIG. 2 is a sectional side view of clamping hub in accordance with the invention.

FIG. 2 is an enlarged-scale sectional view of the clamping hub 15, mandrel 14 and shaft 16 shown in FIG. 1. Like parts bear the same reference numerals. The clamping hub 15 includes a clamping sleeve 27. The mandrel 14 is fixed to the sleeve 27 secured to one end of the shaft 16 in the axial direction by means of clamping bolts 28 and 29 fitted in the clamping sleeve 27, a spacer tube 30, a screw 31, two star washers 32 and 33, and two pins 34 and 35.

At 36 and 37 the two clamping elements 28 and 29 have centric cylindrical flanges for holding and guiding the star washers 32 and 33 respectively. The clamping element has an internal screwthread which is centered relative to the axis of rotation and which is engaged by a screw 31 which extends through an internal bore in the clamping element 28. The clamping element 29 is locked against rotation by the pins 34 and 35, which engage in bores in the clamping sleeve 27.

Figure 3:
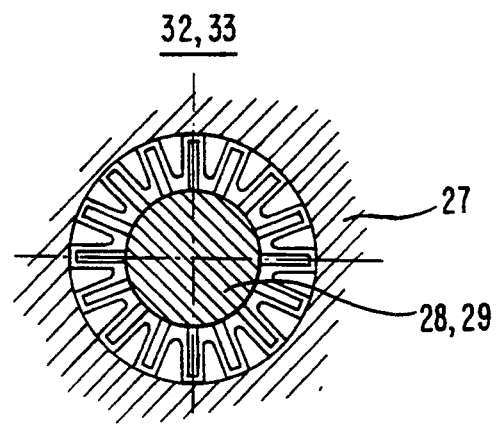
FIG. 3 is a plan view of a star washer.

The star washers 32 and 33 fitted in the clamping sleeve 27 are conical rings of spring steel which, viewed in the plan view of FIG. 3, have radial slits which alternately issue from the outer edge and the inner edge. When the cone is flattened by tightening the screw 31 the outer diameter of the star washers 32 and 33 increases and at the same time the inner diameter decreases. At the points 38 and 39 the outer diameter of the clamping sleeve 27 then increases locally, so that by means of its mandrel 14 the head disc 10 is exactly and non-positively held in position on the shaft 16. In order to preclude wobbling of the head disc 10 the distance between the star washers 32 and 33, which is in fact determined by the length of the spacer tube 30, should be at least equal to the outer diameter of the clamping hub 15.

In a practical embodiment of the invention the clamping sleeve 27 of the clamping hub is made of a copper-nickel alloy and has a diameter of approximately 16 mm. The inner bore of the mandrel 14 is approximately 5 $\mu$m larger than the outer diameter of the clamping sleeve 27. The maximum increase of the outer diameter of the clamping sleeve 27 at the locations 38 and 39 is approximately 10 $\mu$m. When the distance between the star washers 32 and 33 is approximately 20 mm the height displacement if a head disc 10 having an outer diameter of approximately 96 mm can be limited to $\leq 2$ $\mu$m. A further advantage of the clamping hub in accordance with the invention is that a relative movement of the individual clamping elements is excluded when the clamping hub is loosened and tightened. Moreover, by means of the arrangement of the star washers 32 and 33 in accordance with the invention it is possible to preclude jamming when the clamping hub 15 is slackened.

In the present example the clamping hub of the scanning device in accordance with the invention has been described in conjunction with a rotary head disc 10. Obviously, it is also possible to use said clamping hub in scanning devices comprising, for example, a rotary upper drum section carrying magnetic heads on its periphery. In that case the upper drum section can also be clamped and released rapidly and without much effort by loosening the smooth running screw 31.

I claim:

1. A scanning device for a magnetic-tape apparatus, said device including a stationary drum section, a rotary member carrying a magnetic head at its periphery and including a mandrel, and a rotatable shaft which defines an axis of rotation and which is rotationally locked to the rotary member, characterised in that:
    a clamping sleeve concentrically engages in the mandrel of the rotary member and is rotationally locked to the end of the shaft,
    two opposing clamping elements and a spacer tube between the clamping elements are arranged within the clamping sleeve, the clamping elements being arranged in the direction of the axis of rotation so as to be axially movable relative to each other, said clamping elements, clamping sleeve and mandrel being concentric with the axis of rotation of said rotatable shaft, and
    a conical clamping ring is interposed between each of the clamping elements and the spacer tube, the clamping rings being radially expandable in the clamping sleeve by the clamping elements for radially expanding the clamping sleeve against said mandrel of said rotary member to lock the rotary member to the clamping sleeve.

2. A scanning device as claimed in claim 1, characterised in that each clamping element comprises a centrically disposed cylindrical flange for centrically retaining the clamping ring.

3. A scanning device as claimed in claim 2, characterised in that one of the clamping elements has an internal screwthread centered relative to the axis of rotation and the other clamping a screw element has an internal bore in line therewith, and extends in the internal bore and engages the internal screwthread of the one clamping element for adjusting the clamping force of the two clamping elements on the clamping rings.

4. A scanning device as claimed in claim 1, characterised in that the clamping rings are conical star washers having an inner and an outer edge and radial slits issuing alternately from the outer edge and the inner edge, the star washers having a non-flattened condition in which the outer diameter at the outer edge is slightly smaller than the inner diameter of the clamping sleeve and the inner diameter at the inner edge substantially corresponds to the outer diameter of the flanges of the clamping elements.

5. A scanning device as claimed in claim 1, characterised in that the distance between the clamping rings is at least equal to the outer diameter of the clamping sleeve.

6. A scanning device as claimed in claim 1, characterised in that the clamping rings are conical star washers having an inner and an outer edge and radial slits issuing alternately from the outer edge and the inner edge, the star washers having a non-flattened condition in which the outer diameter at the outer edge is slightly smaller than the inner diameter of the clamping sleeve and the inner diameter at the inner edge substantially corresponds to the outer diameter of the flanges of the clamping elements.

7. A scanning device for a magnetic tape apparatus, said device comprising:
    a drum section,
    a rotary member rotatable with respect to said drum section about an axis of rotation and including an internal wall defining a bore through said rotary member and concentric with the axis of rotation;
    a magnetic head carried on said rotary member;
    a shaft aligned with the axis of rotation of the rotary member and including an end portion;
    a sleeve concentrically fixed to said shaft end portion and extending within said bore in said rotary member; and
    radially expandable clamping means arranged within said sleeve for radially expanding said sleeve to clamp said sleeve against said internal wall of said rotary member.

8. A scanning device according to claim 7, wherein said clamping means includes first and second axially spaced and radially expandable clamping rings and an elongate threaded member extending axially through said clamping rings, said threaded member being rotatable in a first direction of rotation for radially expanding the clamping rings to increase the clamping force and rotatable in the opposite direction of rotation for decreasing the clamping force.

9. A scanning device according to claim 8, wherein said shaft end portion includes an end face and said sleeve includes an end wall fixed to said end face.

10. A scanning device according to claim 7, wherein said shaft end portion includes an end face and said sleeve includes an end wall fixed to said end face.

11. A scanning device for a magnetic tape apparatus, said device comprising:

a stationary drum section,
   a rotary member rotatable with respect to said drum section about an axis of rotation and including a cylindrical internal wall defining a bore through said rotary member and concentric with the axis of rotation;
   a rotatable shaft aligned with the axis of rotation of the rotary member and including an end portion;
   a cylindrical sleeve having an end wall fixed to said shaft end portion, said sleeve concentrically extending within said bore in said rotary member and including an internal sleeve surface and an outer sleeve surface which extends with clearance fit with said internal wall of said rotary member;
   a pair of radially expandable conical clamping rings within said sleeve;
   spacing means between said clamping rings for axially spacing said clamping rings within said sleeve;
   first and second clamping elements disposed within said sleeve, each having a cylindrical flange extending through a respective clamping ring for centrically retaining said clamping ring within said sleeve, said second clamping element being disposed closer to said end wall of said sleeve than said second clamping element, said second clamping element having an internal screwthread centered relative to the axis of rotation and said first clamping element having an internal bore aligned therewith; and
   a screw extending axially within said sleeve through said internal bore of said first clamping element and threadably engaging said screwthread of said second clamping element, rotation of said screw in one direction of rotation squeezing said clamping rings between said clamping elements and said spacing means, said squeezing causing said clamping rings to radially expand against said inner sleeve surface, expanding said sleeve to clamp said outer sleeve surface against said bore of said rotary member without causing axial movement of said sleeve with respect to said rotary member.

12. A scanning device as claimed in claim 11, characterized in that the clamping rings are conical star washers having an inner and an outer edge and radial slits issuing alternately from the outer edge and the inner edge, the star washers having a non-flattened condition in which the outer diameter at the outer edge is slightly smaller than the inner diameter of the clamping sleeve and the inner diameter at the inner edge substantially corresponds to the outer diameter of the flanges of the clamping elements.

13. A scanning device as claimed in claim 12, characterized in that the distance between the clamping rings is at least equal to the outer diameter of the clamping sleeve.

14. A scanning device as claimed in claim 11, characterized in that the distance between the clamping rings is at least equal to the outer diameter of the clamping sleeve.

* * * * *